(12) United States Patent
Chawla et al.

(10) Patent No.: US 12,242,874 B2
(45) Date of Patent: Mar. 4, 2025

(54) MIGRATION OF VIRTUAL COMPUTING STORAGE RESOURCES USING SMART NETWORK INTERFACE CONTROLLER ACCELERATION

(71) Applicant: Dell Products L.P., Round Rock, TX (US)

(72) Inventors: Gaurav Chawla, Austin, TX (US); William Price Dawkins, Lakeway, TX (US); Mahmoud B. Ahmadian, Austin, TX (US); Waseem Ali Raja, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 17/384,459

(22) Filed: Jul. 23, 2021

(65) Prior Publication Data

US 2023/0026015 A1  Jan. 26, 2023

(51) Int. Cl.
G06F 9/455 (2018.01)
G06F 9/50 (2006.01)
G06F 9/54 (2006.01)

(52) U.S. Cl.
CPC ...... G06F 9/45558 (2013.01); G06F 9/45545 (2013.01); G06F 9/5088 (2013.01); G06F 9/542 (2013.01); G06F 2009/4557 (2013.01); G06F 2009/45595 (2013.01)

(58) Field of Classification Search
None
See application file for complete search history.

(56) References Cited

U.S. PATENT DOCUMENTS

| 8,812,907 B1* | 8/2014 | Bissett | G06F 11/2097 714/20 |
| 2005/0160423 A1* | 7/2005 | Bantz | G06F 9/4881 718/1 |
| 2011/0145471 A1* | 6/2011 | Corry | G06F 9/4856 718/1 |

(Continued)

FOREIGN PATENT DOCUMENTS

CN  112099908 A  12/2020

OTHER PUBLICATIONS

Non-Final Office Action, U.S. Appl. No. 17/239,859 mailed May 31, 2024, U.S. Patent and Trademark Office.

*Primary Examiner* — Charles E Anya
(74) *Attorney, Agent, or Firm* — Jackson Walker L.L.P.

(57) ABSTRACT

An information handling system may include a processor; a network interface; and a physical storage resource having data stored thereon that is usable by a virtual resource that is executable on the processor. The network interface may accelerate migration of the data to a destination system by, in response to a command from a virtual machine manager: offloading, from the processor, a copying process configured to copy the data to the destination system; tracking portions of the data that are changed by the virtual resource during the copying process; notifying the virtual machine manager that a designated checkpoint has been reached in the copying process; causing the virtual resource to pause; completing the copying process; and causing the virtual resource to resume and use the copied data at the destination instead of the data on the physical storage resource.

18 Claims, 2 Drawing Sheets

(56) References Cited

U.S. PATENT DOCUMENTS

| | | | |
|---|---|---|---|
| 2015/0007172 A1* | 1/2015 | Hudzia | G06F 9/45558 |
| | | | 718/1 |
| 2015/0081943 A1* | 3/2015 | Larson | G06F 13/26 |
| | | | 710/264 |
| 2015/0205542 A1* | 7/2015 | Antony | G06F 9/45558 |
| | | | 711/162 |
| 2015/0331715 A1 | 11/2015 | Sathyanarayana | |
| 2015/0381589 A1 | 12/2015 | Tarasuk-Levin et al. | |
| 2019/0065231 A1 | 2/2019 | Schmisseur et al. | |
| 2021/0124601 A1 | 4/2021 | Das | |
| 2021/0232331 A1* | 7/2021 | Kannan | G06N 20/00 |
| 2022/0066806 A1 | 3/2022 | Ramanathan et al. | |
| 2022/0121503 A1* | 4/2022 | Bhide | H04L 41/5025 |
| 2024/0069944 A1* | 2/2024 | Ajila | G06F 9/45558 |

* cited by examiner

MIGRATION OF VIRTUAL COMPUTING STORAGE RESOURCES USING SMART NETWORK INTERFACE CONTROLLER ACCELERATION

TECHNICAL FIELD

The present disclosure relates in general to information handling systems, and more particularly to methods and systems for migration of virtual computing storage resources accelerated by a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, an information handling system includes a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In many instances, it may be desirable or needed to move the execution and/or storage resources of a virtual machine from one hardware resource to another hardware resource (e.g., from one processor or processor core to another processor or processor core), or from one hypervisor to another hypervisor, or from one information handling system to another information handling system, without interruption in service. Such migration may enable the underlying hardware to be taken down for maintenance without affecting end users or other applications. Existing approaches to migration typically require significant processor time to handle data transfer and interrupt handling for the migration. Thus, systems and methods to perform migration while reducing an amount of processor capacity needed for such migration is desirable.

This application is related to U.S. patent application Ser. No. 17/239,859 (U.S. Patent Application Publication No. 2022/0342688 which was filed on Apr. 26, 2021 and which is incorporated by reference herein in its entirety. The '859 application describes generally the migration of running virtual machines themselves (referred to in some embodiments as vMotion), while the present application concerns instead the migration of their data and storage resources (referred to in some embodiments as Storage vMotion). The data used by a virtual machine may include any configuration files, metadata, BIOS files, logs, archives, disk images, swap files, snapshots, suspended VM files, or other files associated with a VM.

For example, some or all of the data that a VM relies on may be migrated to a different storage location while the VM continues running. In some embodiments, the data may be migrated from a local storage location to a cloud storage location instead of to a different local storage location. In some embodiments, the data may be migrated from one cloud storage location to a different cloud storage location.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing approaches to migration of virtual machine storage resources within an information handling system may be reduced or eliminated.

In accordance with embodiments of the present disclosure, an information handling system may include a processor; a network interface; and a physical storage resource having data stored thereon that is usable by a virtual resource that is executable on the processor. The network interface may accelerate migration of the data to a destination system by, in response to a command from a virtual machine manager: offloading, from the processor, a copying process configured to copy the data to the destination system; tracking portions of the data that are changed by the virtual resource during the copying process; notifying the virtual machine manager that a designated checkpoint has been reached in the copying process; causing the virtual resource to pause; completing the copying process; and causing the virtual resource to resume and use the copied data at the destination instead of the data on the physical storage resource.

In accordance with these and other embodiments of the present disclosure, a method may include, in response to a command to migrate data associated with a virtual resource from a physical storage resource to a destination system: offloading, by a processor of an information handling system comprising the physical storage resource, a copying process configured to copy the data to the destination system, wherein the copying process is offloaded to a network interface; tracking portions of the data that are changed by the virtual resource during the copying process; the network interface notifying a virtual machine manager associated with the virtual resource that a designated checkpoint has been reached in the copying process; causing the virtual resource to pause; completing the copying process; and causing the virtual resource to resume and use the copied data at the destination instead of the data on the physical storage resource.

In accordance with these and other embodiments of the present disclosure, an article of manufacture may include a non-transitory, computer-readable medium having instructions thereon that are executable by a processor of an information handling system for: executing a virtual resource; transmitting a command to a network interface of the information handling system to migrate data associated with the virtual resource from a physical storage resource to a destination system; offloading a copying process configured to copy the data to the destination system, wherein the copying process is offloaded to the network interface; tracking portions of the data that are changed by the virtual resource during the copying process; notifying, by the network interface, a virtual machine manager associated with the virtual resource that a designated checkpoint has been reached in the copying process; causing the virtual resource to pause; completing the copying process; and causing the virtual resource to resume and use the copied data at the destination instead of the data on the physical storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
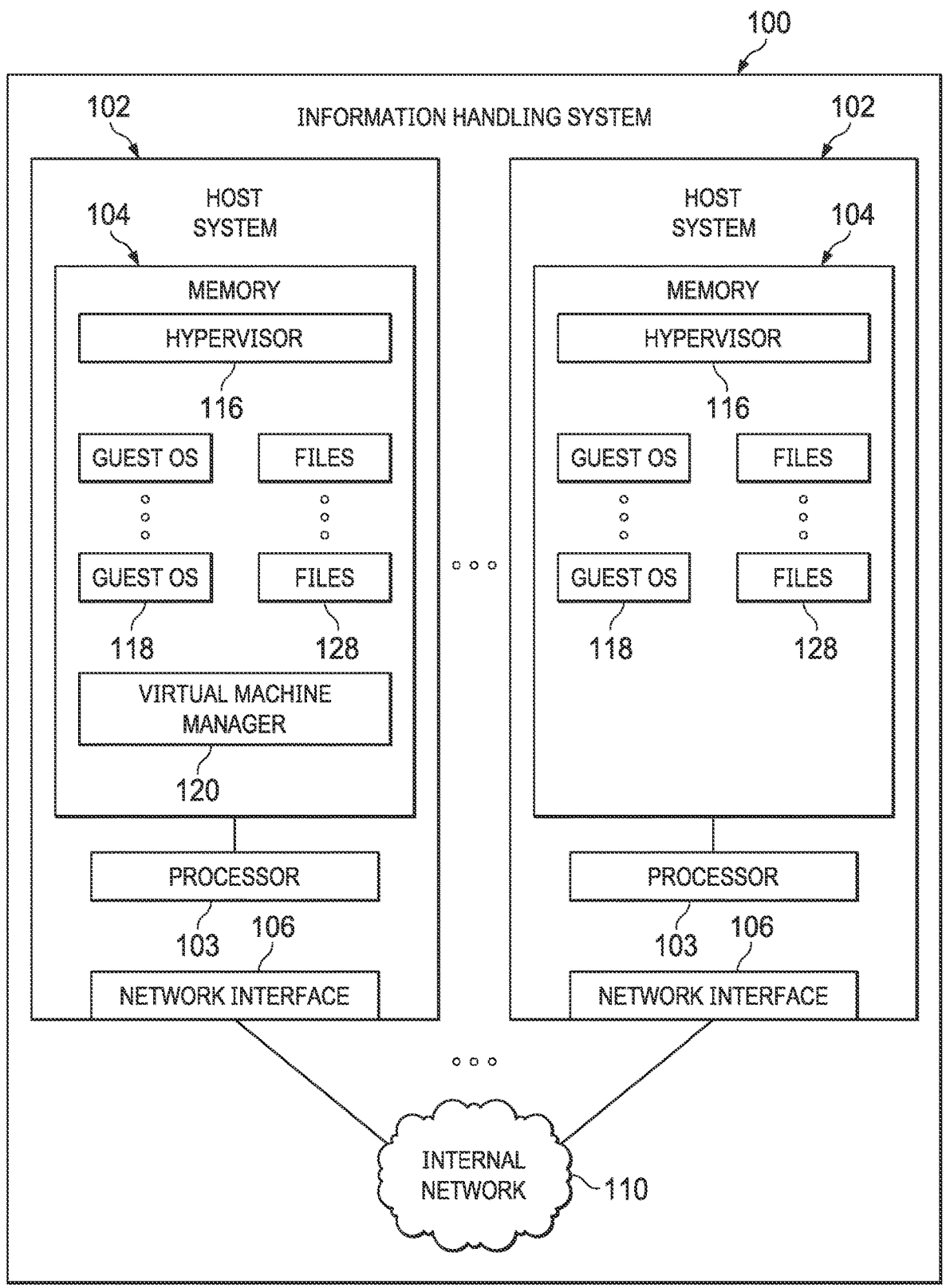
FIG. 1 illustrates a block diagram of selected components of an example information handling system, in accordance with embodiments of the present disclosure.
Figure 2:
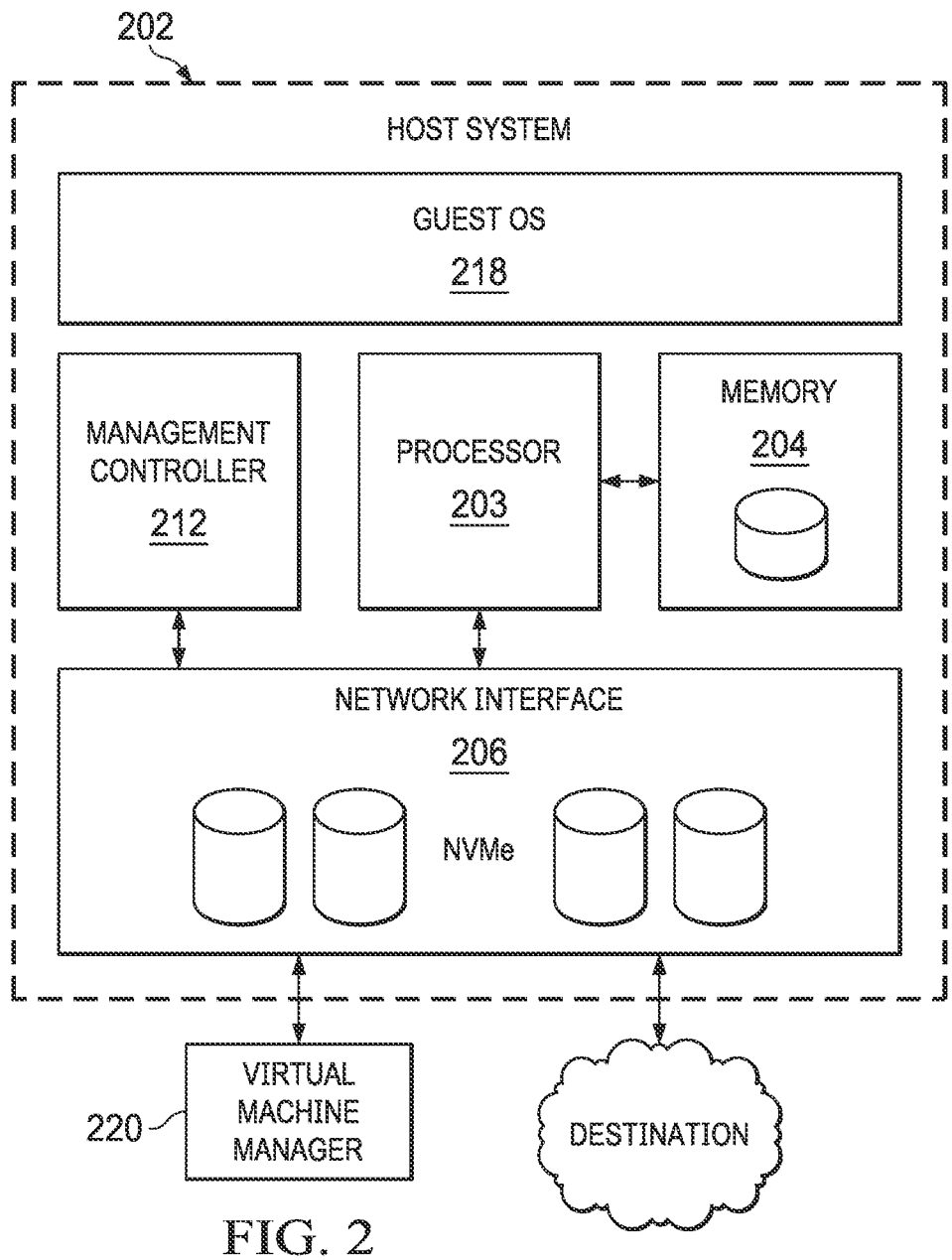
FIG. 2 illustrates a block diagram of an example architecture, in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

Memory 104 may further include one or more sets of files 128, which may be used by guest OSes 118. For example, in some embodiments, memory 104 may include a separate set of files 128 (e.g., in a particular folder or directory) associated with each guest OS 118. The data stored in files 128 may include configuration files, metadata, BIOS files, logs, archives, disk images, swap files, snapshots, suspended VM files, or any data used by a particular guest OS 118.

A hypervisor 116 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 102 and internal network 110. A network interface 106 may enable its associated information handling system 102 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a smart network interface card or "smartNIC" which may offer capabilities not found in traditional NICs. In addition to the stateful and custom offloads a smartNIC may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

In accordance with embodiments of the present disclosure, a network interface 106 may be configured to accelerate migration of a guest OS 118 and/or its associated files 128 from one host system 102 to another host system 102. In response to a request from virtual machine manager 120 to migrate a guest OS 118 and/or its files 128 from a source host system 102 to a destination host system 102, network interface 106 of the source host system 102 may interact with hypervisor 116 of the source host system 102 and/or hypervisor 116 of the destination host system 102 to offload some or all of the processing required to accomplish such a migration, reducing the burden that would normally fall on hypervisor(s) 116 and/or host system(s) 102. Network interface 106 of the source host system 102 may thus perform movement of data associated with a guest OS 118 from the source host system 102 to memory 104 of the destination host system 102.

In some embodiments, the data for a particular guest OS 118 may be transferred, while the guest OS 118 itself may continue executing on the same host system 102. In such cases, the source and destination host system 102 may be identical, and the source and destination hypervisor 116 may also be identical.

In some embodiments, network interface 106 may leverage technologies such as Non-Volatile Memory Express (NVMe) over Fabric (NVMe-oF) and/or NVMe over Remote Direct Memory Access (RDMA) to accomplish such transfers.

At a high level, some embodiments of the present disclosure may operate as follows. A source working folder (which may include configuration files, logs, swap space, snapshots, etc.) may be copied to the target datastore. The guest OS's files may in some embodiments be copied to the target datastore and completed while the I/O is being mirrored in a single pass. The source guest OS may then be suspended, and execution may be resumed on the destination copy of the data. The source guest OS's folder and disk files may then be deleted from the source datastore.

Turning now to FIG. 2, a block diagram of an example architecture is shown, according to some embodiments. Selected components of a source host system 202 may include a processor 203, a memory 204, a management controller 212 such as a BMC, and a network interface 206 such as a SmartNIC. Network interface 206 may include various specialized elements such as processors, memory, etc. As shown, network interface 206 may include NVMe storage and/or an NVMe interface. In one embodiment, processor 203 may be coupled to memory 204 and/or network interface 206 via a Compute Express Link (CXL) interconnect.

In one embodiment, virtual machine manager 220 (which may execute on host system 202 or on another system) may initiate a storage transfer for the storage resources of one or more guest OSes 218 by communicating directly with network interface 206. Network interface 206 may notify a hypervisor associated with guest OS 218, which may set up a shared memory region between host system 202 and network interface 206 via the use of an Input-Output Memory Management Unit (IOMMU). The shared memory region may be used to sync metadata and changed storage blocks while the transfer task is in progress. For example, whenever the running guest OS 218 performs a write operation during the transfer, the hypervisor may keep a log of that write in the shared memory region to inform network interface 206.

Network interface 206 may begin copying the data associated with guest OS 218 to the destination, which may be another host system, a cloud storage destination, etc. While the data is being copied, network interface 206 may keep track of changed storage blocks via the shared memory region.

The procedure may continue iteratively copying changed blocks until a designated checkpoint is reached. For example, when the number of changed blocks falls below some threshold, or the procedure has executed for a threshold amount of time or a threshold number of iterations, the checkpoint may be triggered. When the copying process reaches that checkpoint, then network interface 206 may notify the hypervisor. The hypervisor may suspend guest OS 218, any remaining data may be copied, and guest OS 218 may then be restarted and referred to the destination location for its data instead of the source location. The data at the source location may then be deleted.

Two different embodiments are specifically contemplated herein regarding restarting the guest OS 218. According to a first embodiment, the hypervisor may create a "shadow" VM which points to the new storage location, but the shadow VM may be immediately paused. Once the transfer is complete, the source VM may be suspended, and execution may resume at the shadow VM.

According to a second embodiment, the shadow VM mentioned above may not be used. In this embodiment, the source VM may continue executing until the checkpoint mentioned above is reached (or the transfer is complete). In particular, once the checkpoint has been reached, the number of remaining changed blocks may be small enough that the system may perform a fast suspend and resume of the VM, wherein upon resume, the VM is pointed to the new location for its data. In particular, the remaining changed blocks may be copied while the VM is suspended.

Thus embodiments of this disclosure may provide many advantages. For example, offloading the transfer of data to a network interface as described herein may allow for disaggregation of the network interface from the host system executing the hypervisor. For example, the network interface may run in a different chassis, and it may in some embodiments perform the transfer in a peer-to-peer fashion without involving the hypervisor at all. In some embodiments, a single network interface may perform a transfer for multiple hypervisors, or multiple network interfaces may be leveraged to perform a transfer for a single hypervisor.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
  a processor;
  a network interface, wherein the network interface comprises a Smart Network Interface Card (SmartNIC); and
  a physical storage resource having data stored thereon that is usable by a virtual resource that is executable on the processor;
  wherein the network interface is configured to accelerate migration of the data to a destination system by, in response to a command from a virtual machine manager:
  offloading, from the processor, a copying process that is configured to copy the data to the destination system, wherein the offloading includes performing selected processing related to the copying process on the network interface instead of performing the selected processing on the processor, wherein the selected processing includes notifying a hypervisor associated with the virtual resource to set up a shared memory region between the processor and the network interface, the shared memory region being usable to track storage blocks associated with the data that are changed by the virtual resource while the copying process is in progress;
  tracking portions of the data that are changed by the virtual resource during the copying process;
  in response to a designated checkpoint being reached in the copying process:
    if a number of remaining changed storage blocks is smaller than a threshold number, performing a fast suspend of the virtual resource;
    completing the copying process; and
    performing a fast resume of the virtual resource and causing the resumed virtual resource to use the copied data at the destination instead of the data on the physical storage resource.

2. The information handling system of claim 1, wherein the designated checkpoint comprises a determination that a number of changed portions of the data that have not yet been copied has decreased below a threshold level.

3. The information handling system of claim 2, wherein the changed portions of the data comprise changed blocks.

4. The information handling system of claim 1, wherein the virtual resource comprises a virtual machine embodied in a guest operating system of the hypervisor.

5. The information handling system of claim 1, wherein causing the virtual resource to resume comprises creating a shadow virtual resource, pausing the shadow virtual resource, and resuming the shadow virtual resource.

6. The information handling system of claim 1, wherein the destination system comprises a cloud storage system.

7. A method comprising, in response to a command to migrate data associated with a virtual resource from a physical storage resource to a destination system:
- offloading, from the processor an information handling system comprising the physical storage resource, a copying process that is configured to copy the data to the destination system, wherein the copying process is offloaded to a network interface, wherein the network interface comprises a Smart Network Interface Card (SmartNIC) and wherein the offloading includes performing selected processing related to the copying process on the network interface instead of performing the selected processing on the processor, wherein the selected processing includes notifying a hypervisor associated with the virtual resource to set up a shared memory region between the processor and the network interface, the shared memory region being usable to track storage blocks associated with the data that are changed by the virtual resource while the copying process is in progress;
  - tracking portions of the data that are changed by the virtual resource during the copying process;
  - in response to a designated checkpoint being reached in the copying process:
    - if a number of remaining changed storage blocks is smaller than a threshold number, performing a fast suspend of the virtual resource;
    - completing the copying process; and
    - performing a fast resume of the virtual resource and causing the resumed virtual resource to use the copied data at the destination instead of the data on the physical storage resource.

8. The method of claim 7, wherein the designated checkpoint comprises a determination that a number of changed portions of the data that have not yet been copied has decreased below a threshold level.

9. The method of claim 8, wherein the changed portions of the data comprise changed blocks.

10. The method of claim 7, wherein the virtual resource comprises a virtual machine embodied in a guest operating system of the hypervisor.

11. The method of claim 7, wherein causing the virtual resource to resume comprises creating a shadow virtual resource, pausing the shadow virtual resource, and resuming the shadow virtual resource.

12. The method of claim 7, wherein the destination system comprises a cloud storage system.

13. An article of manufacture comprising a non-transitory, computer-readable medium having instructions thereon that are executable by a processor of an information handling system for:
- executing a virtual resource;
- transmitting a command to a network interface of the information handling system to migrate data associated with the virtual resource from a physical storage resource to a destination system, wherein the network interface comprises a Smart Network Interface Card (SmartNIC);
- offloading, from the processor, a copying process that is configured to copy the data to the destination system, wherein the offloading includes performing selected processing related to the copying process on the network interface instead of performing the selected processing on the processor, wherein the selected processing includes notifying a hypervisor associated with the virtual resource to set up a shared memory region between the processor and the network interface, the shared memory region being usable to track storage blocks associated with the data that are changed by the virtual resource while the copying process is in progress;
  - tracking portions of the data that are changed by the virtual resource during the copying process;
  - in response to a designated checkpoint being reached in the copying process:
    - if a number of remaining changed storage blocks is smaller than a threshold number, performing a fast suspend of the virtual resource;
    - completing the copying process; and
    - performing a fast resume of the virtual resource and causing the resumed virtual resource to use the copied data at the destination instead of the data on the physical storage resource.

14. The article of claim 13, wherein the designated checkpoint comprises a determination that a number of changed portions of the data that have not yet been copied has decreased below a threshold level.

15. The article of claim 14, wherein the changed portions of the data comprise changed blocks.

16. The article of claim 13, wherein the virtual resource comprises a virtual machine embodied in a guest operating system of the hypervisor.

17. The article of claim 13, wherein causing the virtual resource to resume comprises creating a shadow virtual resource, pausing the shadow virtual resource, and resuming the shadow virtual resource.

18. The article of claim 13, wherein the destination system comprises a cloud storage system.

* * * * *